United States Patent [19]
Berlin et al.

[11] Patent Number: 5,397,179
[45] Date of Patent: Mar. 14, 1995

[54] METHOD AND APPARATUS FOR MIXING FLUIDS

[75] Inventors: Alexander A. Berlin, Moscow; Yuri A. Prochukhan; Karl S. Minsker, both of Ufa; Alexei S. Konoplyov; Valeri Z. Kompanietz, both of Moscow; Sergei K. Minsker, Ufa, all of U.S.S.R.

[73] Assignee: Turbocom, Inc., St. Charles, Mo.

[21] Appl. No.: 277,257

[22] Filed: Jul. 19, 1994

Related U.S. Application Data

[63] Continuation of Ser. No. 938,018, Aug. 28, 1992, abandoned.

[51] Int. Cl.⁶ .............................................. B01F 5/06
[52] U.S. Cl. .................................... 366/337; 366/336; 366/183; 138/38; 138/42; 165/154
[58] Field of Search ............... 366/336, 337, 338, 339, 366/340, 341, 182, 174, 183; 48/189.4; 138/37, 38, 39, 40, 42, 43, 44, 155; 165/154, 155, 174

[56] References Cited

U.S. PATENT DOCUMENTS

| | | | |
|---|---|---|---|
| 1,405,707 | 2/1922 | Beers | 366/336 |
| 1,637,697 | 8/1927 | Jocobsen | 366/336 |
| 1,863,554 | 6/1932 | Alberts | 165/154 |

(List continued on next page.)

FOREIGN PATENT DOCUMENTS

| | | |
|---|---|---|
| 1233485 | 3/1988 | Canada . |
| 0297238 | 4/1989 | European Pat. Off. . |
| 53[1978]-249-26 | 5/1975 | Japan . |
| 52[1978]-124-202 | 10/1978 | Japan . |
| 2181145 | 4/1987 | United Kingdom . |

OTHER PUBLICATIONS

Brodkey, Robert S., Editor, *Turbulence in Mixing Operations*, 1975, pp. xi, 220–223, and 246–247.
Libby, P. A. and Williams, F. A., Editors, *Turbulent Reacting Flows*, 1980, p. 1 of 3. Turbulent Flows with Nonmixed Reactants by R. W. Bilger.
Vol. (A)XXX of *Visokomolecularnie Soedinenia*, 1988—*Affect of the methods of mixing on the character of hyperfast processes of polymerization*, by U. A. Prochuchan, K. C. Minscker, M. M. Karpasas, Al.Al. Berlin, R. H. Bachitova and N. S. Enickolopian.
Vol. 31 of *Visokomolecularnie Soedinenia*, 1989—*Effectiveness of the External Heat Removal in Superfast Polymerization Processes*, by A. A. Berlin, Yu A. Prochukhan, K. S. Minsker, G. G. Aleksanyan, S. V. Grobov and N. S. Enikolopyan.
*Polymer–Plastic Technological Engineering*, 30(2&3), 253-297, 1991—*The Macroscopic Kinetics of Rapid Processes of Polymerization in Turbulent Flows*, by Al. Al. Berlin, K. S. Minsker, Yu A. Prochukhan and N. S. Yenikolopyan.

*Primary Examiner*—David A. Scherbel
*Assistant Examiner*—Reginald L. Alexander
*Attorney, Agent, or Firm*—Rogers, Howell & Haferkamp

[57] ABSTRACT

A device and method for inducing turbulence in the flow of a fluid in the course of a continuous flow process are disclosed. The device comprising a series of chambers extending along an axis. Each chamber is defined by (1) a cylindrical conduit that extends along the axis and between opposite ends and has a constant internal diameter along the axis; (2) a frusto-conical diffuser that has an internal diameter increasing along the axis from a reduced internal diameter at an inlet of the diffuser to an internal diameter substantially equal to that conduit at an outlet of the diffuser; and (3) a frusto-conical confuser that has an internal diameter decreasing along the axis from an internal diameter substantially equal to that of the conduit at an inlet of the confuser to a reduced diameter at an outlet of the confuser. The conduit, diffuser and confuser of each chamber are arranged coaxially and the cylindrical conduit extends from the outlet of the diffuser to the inlet of the confuser. The outlet of one of the confusers and the inlet of one of the diffusers of adjacent chambers in the series connect the chambers together. According to the method, fluent materials are injected through the device.

59 Claims, 1 Drawing Sheet

U.S. PATENT DOCUMENTS

| | | | |
|---|---|---|---|
| 1,880,533 | 10/1932 | Thomas | 165/154 |
| 1,912,644 | 6/1933 | Lenning | 165/154 |
| 2,312,639 | 3/1943 | Gronemeyer | 366/91 |
| 3,133,843 | 12/1963 | Li | 422/135 |
| 3,358,749 | 12/1967 | Chisholm et al. | 165/154 |
| 3,563,710 | 2/1971 | Dew, Jr. et al. | 422/135 |
| 3,609,125 | 9/1971 | Kimura et al. | 422/138 |
| 3,628,918 | 12/1971 | Beals et al. | 526/64 |
| 3,630,688 | 12/1971 | Takiguchi et al. | 422/135 |
| 3,674,740 | 7/1972 | Vernaleken et al. | 422/135 |
| 3,697,230 | 10/1972 | Fujimoto et al. | 366/336 |
| 3,874,643 | 4/1975 | Lorenian et al. | 366/338 |
| 4,175,169 | 11/1979 | Beals et al. | 526/64 |
| 4,209,599 | 7/1980 | Brady et al. | 526/64 |
| 4,215,207 | 7/1980 | Durand et al. | 526/64 |
| 4,270,601 | 6/1981 | Lancaster | 165/154 |
| 4,275,177 | 6/1981 | Walkenhorst et al. | 422/138 |
| 4,306,617 | 12/1981 | Lancaster | 165/154 |
| 4,313,680 | 2/1982 | Honnen | 366/337 |
| 4,343,929 | 8/1982 | Sugio et al. | 422/135 |
| 4,344,752 | 8/1982 | Gallagher, Jr. | 366/336 |
| 4,361,407 | 11/1982 | Pellegrini | 366/340 |
| 4,363,552 | 12/1982 | Considine | 366/336 |
| 4,383,093 | 5/1983 | Shiraki et al. | 422/135 |
| 4,416,856 | 11/1983 | Durand et al. | 422/131 |
| 4,437,513 | 3/1984 | Castiglioni et al. | 165/154 |
| 4,569,387 | 2/1986 | Hartmann et al. | 165/154 |
| 4,594,005 | 6/1986 | Sakamoto et al. | 366/336 |
| 4,610,850 | 9/1986 | Nikiforov et al. | 422/138 |
| 4,633,935 | 1/1987 | Hartmann et al. | 165/154 |
| 4,712,921 | 12/1987 | Sugiura | 366/336 |
| 4,808,007 | 2/1989 | King | 366/337 |
| 4,832,500 | 5/1989 | Brunold et al. | 366/340 |
| 4,861,165 | 8/1989 | Frederiksoon et al. | 366/336 |
| 4,964,733 | 10/1990 | Frederiksson et al. | 366/336 |
| 5,145,256 | 9/1992 | Wiemers et al. | 366/336 |

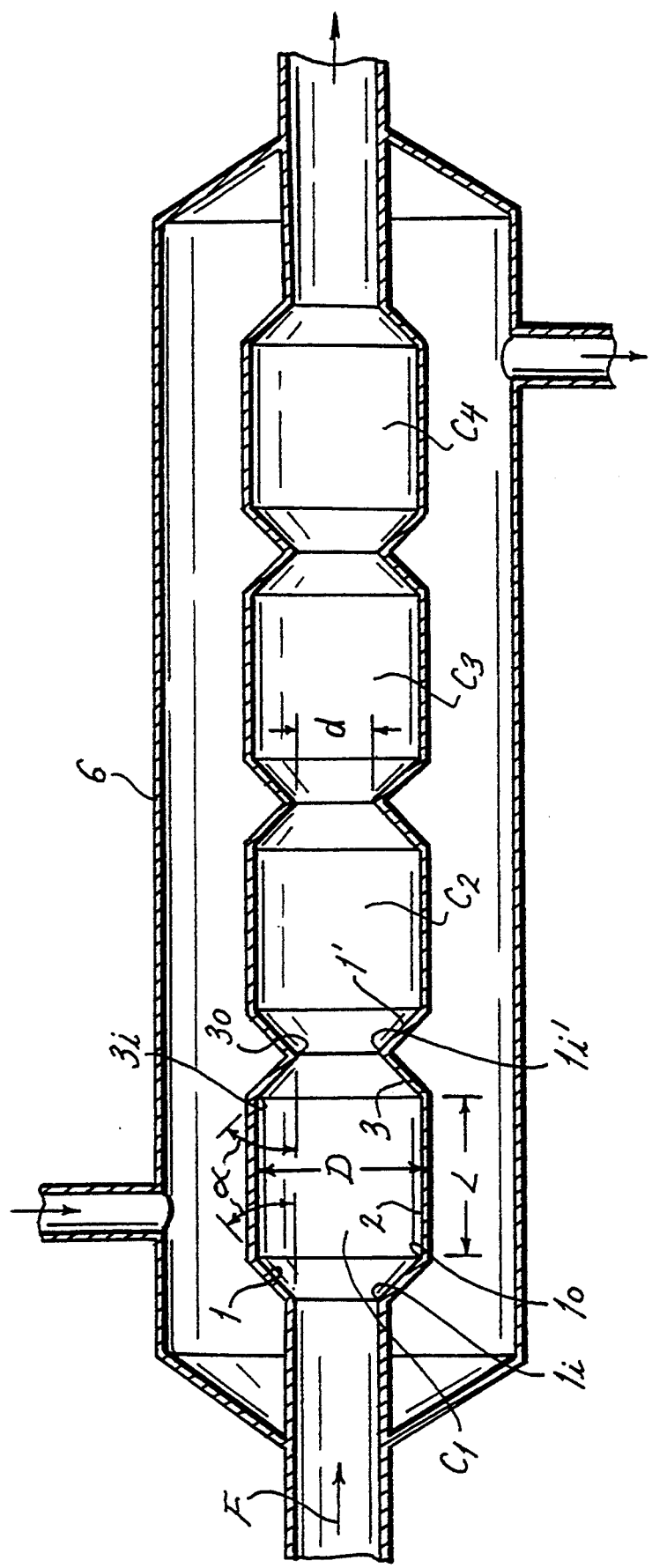

METHOD AND APPARATUS FOR MIXING FLUIDS

This is a continuation of application Ser. No. 07/938,018, filed on Aug. 28, 1992, now abandoned.

BACKGROUND OF THE INVENTION (1) Field of the Invention

The present invention relates to microreactors, heat exchangers and mixers, and more particularly to apparatus and methods that utilize continuous flow techniques to induce substantial turbulence within the flow stream to provide a very high degree of mixing and/or heat transfer.

(2) Description of the Prior Art

A number of mixer designs have been employed in a variety of applications to mix fluent materials. Such applications include those in which it is desired to form an intimate mixture of two or more components, to form an emulsion, to cool or to heat a fluid, or to carry out chemical reactions. For example, in many chemical reactions mixing is desirable or necessary to introduce kinetic energy or to bring reactant molecules into reactive proximity to each other. This is especially desirable in many polymerization reactions in which repeated introduction of fresh reactants to the newly-created reaction sites of the burgeoning polymer is necessary to continue the chain formation. The increased exposure of reactants to each other can also be effective in increasing yield and reducing reaction times, permitting higher production rates and smaller reactors. Thus, in many reactions, the rate of chemical reaction is related to the rate of mixing of the reactants.

In addition or in the alternative, heat transfer into or out of a fluid may also be enhanced by mixing. In such situations, the turbulence constantly exposes new or other portions of the fluid to the interface at which heat transfer takes place. This is helpful in maintaining isothermal conditions, which can be particularly useful in many reactions, such as exothermic or endothermic reactions or reactions that must be carried out within a narrow temperature range. For example, hyperfast, low temperature polymerization must be carried out with significant agitation and at substantially isothermal conditions in order to produce a polymer of molecular weights within a narrow range.

Turbulence may be induced in continuous flow processes by static means, which affect the flow of a fluid through the mixer or reactor, or by moving agitators. Static mixers provide a number of advantages over mixers that contain a moving agitation means. For example, because separate mechanical agitation means are unnecessary, static mixers generally are lower cost and require less maintenance. In addition, they are less expensive to operate because they do not require energy input for agitation.

On the other hand, conventional static mixers also suffer from several disadvantages over mixers that employ mechanical agitation means. Perhaps most prominent of these disadvantages is the generally lower degree of agitation or turbulence produced by conventional static mixers. Thus, relatively large mixers or reactors are often needed. Moreover, the disadvantage of the less intense agitation is particularly pronounced in some applications in which even mixers with moving agitation means often do not create as much turbulence as desired. Aside from the failure to achieve the full measure of benefits associated with high turbulence as discussed above, the relatively low turbulence produced by many conventional mixers that are coupled with a heat transfer means requires the use of small conduits to increase transfer. The use of such conduits not only is expensive, but requires higher pressures to maintain acceptable flow rates.

Accordingly, a variety of mixer designs have been created in an attempt to combine the benefits of static mixers with the ability to achieve a degree of turbulence at least as great as, and perhaps even greater than, that of mixers that have moving agitators. Such static mixers typically employ such means as baffles or a series of segments of increased and decreased cross-sectional areas to induce turbulence in the flow of the fluid or combination of fluids, thereby to promote mixing.

For example, continuous flow polymerization reactors, some of which have a series of such segments, are shown in U.S. Pat. Nos. 3,609,125 and 3,697,230 to Yoshihisa Fujimoto et al. which disclose an apparatus which induces mixing not by expansion or contraction of the fluid path but by directing the fluid in a swirling motion, U.S. Pat. Nos. 3,628,918 and 4,175,169 to Beals et al. which show a polymerization reactor of alternating reaction and cooling zones wherein the mixing is accomplished by turbulent flow through constant diameter sections of tubing, and U.S. Pat. No. 3,674,740 to Vernaleken et al. which is directed to production of polycarbonate by what appears to be mere conventional flow through constant diameter tubes at a rate which associated with turbulent flow; i.e., a Reynolds number in excess of 2,000. U.S. Pat. No. 3,563,710 to Dew, Jr. et al. shows a finisher for removal of volatile by-products in carrying melt condensation polymerization to completion. However, the apparatus of Dew, Jr. et al. does not mix by expanding and contracting the cross-sectional area of the flowing fluid along the length of the mixer. Rather, it induces turbulence by a swirling motion of the mixture about rotor members identified in the patent by the numeral 2.

Various heat transfer apparatus that include sections of increased and decreased cross-sectional areas have been shown, for example, in U.S. Pat. Nos. 1,863,554; 4,270,601; 4,306,617; 4,437,513; 4,569,387 and 4,633,935. Of course, in heat transfer apparatus, alternating sections of increased and decreased cross-sectional areas, created such as by the use of corrugated tubing, is generally known to be employed simply to increase surface area thereby to effect greater heat transfer. In such apparatus, the changes in the cross-sectional area generally are insufficient to develop an optimal degree of turbulence in the fluid passing therethrough.

Other references are directed to apparatus which have decreased cross-sectional areas in the form of orifices through which a fluid passes. In particular, U.S. Pat. No. 2,312,639 shows a device for treating plastic. The plastic is passed through a plate having a number of perforations to increase the surface area of a mass of plastic. A significant degree of mixing does not appear to be imparted thereby to the highly viscous plastic. U.S. Pat. No. 4,313,680 shows a reactor for fast reaction which a flow-deflector is included to deflect the flow 90° through several orifices.

U.S. Pat. No. 3,874,643 discloses a method for conveying pulverulent or granular thermoplastic or thermosetting material while simultaneously plasticizing, mixing and homogenizing the material by passing it through a plasticizer having alternately narrow and wide tubular passages interconnected by conic sections.

U.S. Pat. Nos. 4,964,733 and 4,861,165 show a generally tubular hydrodynamic mixer having no cylindrical sections. According to these patents, the device is designed for a number of substances and applications in the paper industry are contemplated.

In any event, mixers are still being sought that can achieve even more intense turbulence than possible with conventional apparatus, particularly for continuous flow operations. It is also highly desirable that such improved turbulence be achieved by a static mixer, especially one of relatively small size.

SUMMARY OF THE INVENTION

Briefly, therefore, the present invention is directed to a novel device for inducing turbulence in the flow of a fluid in the course of a continuous flow process. The device comprises a plurality of chambers, each of which has a central conduit section extending from an inlet section to an outlet section. The inlet section has a shape that progressively reduces the velocity and pressure of fluid flowing through it, the central section has a shape that tends to maintain constant the pressure and velocity of fluid flowing through it, and the outlet section has a shape that progressively increases the pressure and velocity of fluid flowing through it. With respect to each pair of the plurality of chambers, the outlet section of the upstream chamber is connected to the inlet section of the downstream chamber in a manner such as to maintain turbulence in fluid flowing through the device.

Thus, in a particular embodiment, the device comprises a series of chambers extending along an axis. Each chamber is defined by (1) a cylindrical conduit that extends along the axis and between opposite ends and has a constant internal diameter along the axis; (2) a frusto-conical diffuser that has an internal diameter increasing along the axis from a reduced internal diameter at an inlet of the diffuser to an internal diameter substantially equal to that of the conduit at an outlet of the diffuser; and (3) a frusto-conical confuser that has an internal diameter decreasing along the axis from an internal diameter substantially equal to that of the conduit at an inlet of the confuser to a reduced diameter at an outlet of the confuser. The conduit, diffuser and confuser of each chamber are arranged coaxially and the cylindrical conduit extends from the outlet of the diffuser to the inlet of the confuser. The outlet of one of the confusers and the inlet of one of the diffusers of adjacent chambers in the series connect the chambers together.

The present invention is also directed to a novel method for mixing fluent materials in a continuous flow process by injecting materials into such device. The process may be used, for example, to form mixtures or emulsions, to improve heat transfer or to aid in effecting chemical reactions.

Among the several advantages found to be achieved by the present invention, therefore, may be noted the provision of a continuous flow static mixer that provides more intense mixing than achieved by conventional devices; the provision of such mixer that is relatively inexpensive to manufacture; the provision of such mixer that permits improved heat transfer; the provision of such mixer that enables better control of temperature throughout the fluids being treated; the provision of such mixer that enables improved control of reactions carried out therein; the provision of such mixer that is of relatively small size; the provision of a method for improved mixing of fluent materials through a static mixer; the provision of such method which provides improved heat transfer; the provision of such method which provides improved control of temperature throughout the material being treated; and the provision of a method of improved control of many types of reactions.

BRIEF DESCRIPTION OF THE DRAWINGS

FIG. 1 is a cross-sectional view of a reaction/mixer of this invention.

DESCRIPTION OF THE PREFERRED EMBODIMENTS

In accordance with the present invention, it has been discovered that superior mixing, heat transfer and temperature uniformity can be achieved in a continuous flow process by injecting fluent materials into and through a device comprising a series of Juxtaposed chambers, each of which is defined by a cylindrical conduit extending from a frusto-conical diffuser to a frusto-conical confuser. Surprisingly, it has been found that this inexpensive design provides considerably faster and more intimate mixing than is achieved with conventional static mixers. Moreover, it has also been discovered that when fluids are passed at a sufficient rate through a device fitted with a heat transfer means, such as a thermostatting jacket, surprisingly more effective (i.e., greater or faster) transfer of heat to or from the fluid and significantly better maintenance of temperature uniformity can be achieved than with conventional static or even nonstatic mixers. The device is suitable for use with any fluid; that is, any fluent material, including liquids, gases and particulates.

Thus, the new design significantly improves the intensity of mixing over that achieved by conventional methods. Such improved mixing is especially advantageous when high speed intimate mixing is required. However, the extremely intense mixing made possible by the new design is also valuable in heat transfer applications, especially when high speed heat transfer and/or maintenance of isothermal conditions is desired, or when carrying out chemical reactions in which intense mixing is desirable, especially many polymerization reactions. In fact, the new design has been found to be surprisingly effective in a wide range of reactions in increasing reaction rates and yields over those achieved with conventional designs.

The device, therefore, is also ideally suited to many chemical reactions in which not only mixing but also heat transfer and/or maintenance of a uniform temperature throughout the reaction mixture is essential. As a result, a degree of control never previously possible can be asserted over many reactions by implementation of the device and method of this invention. For example, chlorination of about half of the double bonds in synthetic rubber (cis-1,4,polyisoprene) is commonly achieved in industrial practice. In conventional processes, some of the chain molecules are nearly fully chlorinated and some have essentially no chlorine content. The distribution of chlorinated and non-chlorinated molecules is not desirable but is impossible to eliminate or control by means of conventional techniques. However, when chlorination is carried out in the device of the present invention, essentially all the molecules in the product are about 50% chlorinated, resulting in a more uniform material with superior properties. The unfavorable results caused by the much higher rate of reaction compared to rate of mixing in standard batch reactions therefore are avoided. The improved mixing and temperature uniformity are particularly suitable to polymerization reaction such as hyperfast, low temperature polymerization, wherein the new design has been found to permit production of polymer within a desired narrow range of molecular weight.

Thus, some examples of synthesis products and processes to which the present device is suited are ethyl chloride, ethylene dichloride, polyisobutylene, high olefin oligomerization, polyisoprene, styrene-butadiene rubber (SBR), butyl rubber and piperylene oligomers. Other products or processes to which the present device may be applied include alkylation of hydrocarbon streams, emulsion polymerization, chlorination reactions, polymer ozonation, neutralizations and processes in which extraction, dispersion and mixing are critical issues. Such products and processes are identified as illustrative of the wide variety of processes to which the present device and techniques may be applied and should not be viewed as a limitation of its applicability.

Moreover, the device that has been found to be capable of providing such numerous benefits is of a design that is inexpensive to manufacture. It involves simply lengths of pipe and conical sections such as reducers. And, because the device is static, it is characterized by the several advantages of low capital costs, low maintenance and low energy consumption. In fact maintenance and shut down times and frequency may be even lower than with conventional static mixers that employ very small passageways such as orifices. The smallest diameter through which the fluid to be treated is routed typically is still much larger than such orifices, making clogging unlikely. The present design also reduces the significant backflow pressures associated with forcing a fluid through a small orifice. Yet, even without such extremely restricted passageways, the device of this invention does not suffer from the conventional drawback of static mixers; namely, a difficulty achieving an intensity of mixing comparable to that achieved by mixers with mechanical agitators. To the contrary, the degree and rate of mixing achieved with the new design has been found to be capable of exceeding what is achieved by typical mixers employing mechanical agitation means. In addition, because of the superior efficiency of the new design, a substantially smaller device of this invention can be used in place of larger prior art devices, thereby cutting costs, including capital costs and other costs related to size and space requirements even further. Also, because a device smaller than conventional reactors may be used, smaller hold-up volumes of reaction mixture are present and so in many cases the method of this invention is safer than prior art techniques. Moreover, the superior heat transfer possible with the device results in energy savings over conventional heat exchangers.

Thus, the present method permits many chemical reactions to be carried out more efficiently. The higher conversion rates result in lower raw material usage, reduced catalyst consumption, reduced by-product formation and reduced waste. The product, therefore, is of higher quality than those synthesized by conventional techniques. The reduced material consumption, improved product quality and reduced by-product and waste formation, therefore, render this new device and method environmentally advantageous as well.

Referring now more particularly to the drawings and FIG. 1, it will be seen that the device of this invention comprises a series of chambers $C_1$, $C_2$, $C_3$ and $C_4$ through which a fluid to be treated flows under pressure in the direction indicated by arrow F. Although four chambers are shown in FIG. 1 for illustrative purposes, it is required only that the number of chambers be at least two. Thus, the series of chambers may be viewed as comprising at least one pair of adjacent chambers, with the series of FIG. 1 comprising three pairs of adjacent chambers; namely, $C_1$ and $C_2$, $C_2$ and $C_3$, and $C_3$ and $C_4$.

In the interest of costs, it is preferred that the lowest number of chambers that stills provides the desired mixing and/or heat exchange without unduly high flow rates be used. Thus, under most conditions the practical number of chambers would not exceed about twelve (i.e., eleven pairs) and more typically, it would not exceed about nine (i.e., eight pairs). Many applications would involve two to about five chambers. Generally, the higher the viscosity of the fluid being treated, the higher the number of chambers and the higher the linear flow rates of the fluid being treated.

The chambers will be described by reference to the first chamber in the series, chamber $C_1$. The other chambers in the series are of equivalent shape and preferably proportional to chamber $C_1$. Most preferably, all chambers are of identical dimensions to the first. Each chamber is defined by an inlet section (shown in FIG. 1 as frusto-conical diffuser 1) and an outlet section (shown in FIG. 1 as frusto-conical confuser 3), which have inlets $1i$ and $3i$, respectively, and outlets $1o$ and $3o$, respectively. As used herein, the term "frusto-conical" refers to a portion of a cone with the top portion near and including the vertex cut off by a plane parallel to the base; in other words, the surface of a frustum, excluding the ends. The diffusers (and confusers) angle outwardly (or inwardly) at an angle $\alpha$ as measured from a line parallel to the axis along which the chambers are arranged serially and about which device is symmetric. In other words, angle $\alpha$ is a measure of the slope of the internal surface of the diffuser or confuser with respect to the axis. Preferably, the angle $\alpha$ is the same for each diffuser and confuser section. Therefore, the shape of the diffuser or inlet section and the shape of the confuser or outlet section are such as to progressively decreases or increases, respectively, the pressure and velocity of the fluid flowing therethrough. The frusto-conical shape of each diffuser and confuser causes respective decreases and increases in pressure and velocity to be exponential; that is, generally proportional to $\tan \alpha$ times the square of the distance along the central axis of the diffuser or confuser.

The outlet $1_o$ of the diffuser 1 and the inlet $3_i$ of the confuser 3 are affixed to respective opposite ends of a cylindrical conduit 2 extending therebetween. The conduit 2 is of constant cross-sectional area, preferably circular of diameter D, and has a length L. All references herein to diameters are to inside or internal diameters. The diffuser 1 has a relatively small or reduced cross-sectional area, preferably circular of diameter d, at its inlet and diverges to a relatively large cross-sectional area, preferably circular of diameter approximately if not exactly equal to that of the conduit 2 at its outlet $1_o$. Thus, the cross-section and the internal diameter of the diffuser increases along its axis from its inlet to its outlet. Accordingly, conduits 2 are of circular cross-section as viewed in the direction of arrow F. The axis along which the chambers are aligned, therefore, is defined by the centers of the circular cross-sections.

The confuser 3 is of dimensions preferably identical to those of diffuser 1, but is of reverse orientation. Thus, confuser 3 has a relatively large cross-section (diameter) approximately equal to that of the conduit 2 at its inlet 3$i$ and converges to a relatively small or reduced cross-section (diameter d) at its outlet 3$o$. That is, the cross-section (internal diameter) of the confuser decreases along its axis from its inlet to its outlet. The inlet 1$i$ of the first chamber in the series, chamber $C_1$ of the diffuser 1, may be defined as the entry port of the device wherein materials to be treated may be injected into the device, while the outlet of the confuser of the last chamber in the series, chamber $C_4$ in the case of FIG. 1, can be defined as the exit port of the device where the treated materials emerge from the device. The chambers C in the series are juxtaposed to abut each other without additional piping therebetween. Thus, the outlet of the confuser and the inlet of the diffuser between adjacent chambers are contiguous or affixed together and the outlet of the confuser of each chamber but the last one in the series may be considered the inlet of the diffuser of the next chamber in the series. For example, the outlet 3$o$ of the confuser 3 of chamber $C_1$ is the inlet 1$i'$ of the diffuser 1' of $C_2$. If the chambers nevertheless are spaced apart, it should be by no more than half the length of either of the chambers in the pair; that is, $\frac{1}{2} \times L$, such as by a conduit of at most $\frac{1}{2} \times L$ in length.

Optionally, the series of chambers may be surrounded by a jacket or shell 6. In such configuration, the device may be employed as a heat exchanger. The shell 6 is of conventional design and any standard heat transfer fluid, such as water, may be employed within the shell. Under ordinary heat transfer conditions, the heat transfer fluid would be directed to flow into port 7 and out of port 9 for concurrent flow as shown in FIG. 1 or, less preferably, into port 8 and out of port 7 for counter-current flow, as desired.

Surprisingly, significantly superior results have been found to be achieved for relatively narrow ranges of relative dimensions and ratios for D, d, L and angle $\alpha$, and the efficacy of mixing falls off sharply upon deviation from these ranges and ratios. Although the wide range of types of operations to which the present device and method are applicable make it impossible to provide generalized formulae for determining the precise combination of optimum dimensions for each case, the ranges of optimum relative dimensions are as follows. The ratio of D to d should be from about 2 to about 5 (or stated differently, d:D should be from about 0.2 to about 0.5), $\alpha$ should be from about 15° to about 60°, 30° to about 60° in most cases and from about 15° to about 30° in certain specialized cases in which the viscosities or densities of two liquid reactants differ greatly such as by about 5:1, and L should be from about equal to d to about 5D, preferably to about 4D, although typically L would be approximately equal to D times angle $\alpha$ as measured in degrees, divided by 15°. The number of chambers has been discussed above.

As noted, the device of this invention can be adapted for several different types of operations, including but not limited to pure mixing, emulsion formation, heat transfer and many different types of chemical reactions, especially rapid chemical reactions such as "fast" reactions (those in which the reaction is at least 50% complete in one minute or less). Because each operation, and each reaction, involves distinct parameters and distinct types of processes, each requires a distinct reactor design. Thus, the optimum dimensions and ratios depend on the particular mixing, heat transfer or reaction operation being carried out. For example, the optimum range of angle $\alpha$ for production of synthetic rubber has been found to be from about 45° to about 60°, for polymerization of isobutylene is from about 43° to about 47°, and for production of alkyl gasoline to be from about 15° to about 19°. As a rule of thumb, which might not apply in a particular situation, when two liquid reactants are treated (and either or both of the reactants may be a combination of liquids), if the proportion of the viscosity of the more viscous liquid to the other is about 5:1, the optimum value for angle $\alpha$ is from about 16° to about 18°, if the proportion is about 4.5:1, the optimum value for angle $\alpha$ is from about 16° to about 20°, if the proportion is about 2:1, the optimum value for angle $\alpha$ is from about 17° to about 45° and preferably about 30° to about 45°, and generally if the liquids are of about equal viscosity (i.e., about 1:1 to about 4:1, especially about 1:1 to about 2:1), the optimum value for angle $\alpha$ is from about 30° to about 60°.

Generally, the optimal design might depend on such factors as the half conversion time of the raw materials, the kinetics involved, the characteristics of the major reactants and diluents therefor such as their ratios, flow rates, phase conditions, densities and viscosities, the changes in densities and viscosities during the process (whether in mixing, reacting or both), operating pressure, side reactions (if any) and their kinetics, heat of reaction, vapor pressure curves, temperature limits, temperature dependencies of kinetic parameters for the main and side reactions, and phase conditions.

The range of optimum dimensions also depends on the spacial orientation of the device. In operation, the device may be oriented horizontally, in which the axis along which the chambers extend serially is horizontal, or vertically, in which that axis is vertical. In the vertical orientation flow upwardly against gravity is preferred. Orientation at angles other than horizontal or vertical is undesirable and has been found to lead to pockets where portions of the fluid being treated stagnate. Generally, it has been found that horizontal orientation results in narrower optimum ranges of relative dimensions than does vertical orientation. Thus, in many applications, vertical orientation is preferred, with flow against gravity.

Typically, the actual overall dimensions depend at least in part on the desired flow rate. Generally, the sizing of the device is based on the linear flow rate through the narrowest passages, those having the diameter d. The device must be small enough to result in a sufficiently high linear flow rate through the narrow passages of diameter d to achieve sufficiently turbulent flow. In cases in which the pressure on the reaction mixture is important, the resulting pressure on the mixture is, of course, a significant consideration. The flow rate should be such as to produce the appropriate pressure. Aside from that consideration, the maximum flow rate is limited by the increased force necessary to pump the materials through the device at the increased rate. Thus, there is no true upper limit to the flow rate. It is guided by the desired pumping force, degree of mixing and production rate. Generally, a point may be reached at which the amount of extra force required to increase the flow rate a certain amount, and the extra costs attendant thereto, are not sufficiently rewarded by the resulting increase in mixing or flow rate. Typically, at some point the pumping force necessary for each incremental increase in flow rate goes up exponentially while the increased degree of mixing and flow rate achieved by such incremental increase in pumping force levels off.

The minimum flow rates necessary to induce sufficient turbulence are dependent upon the characteristics of the fluids themselves, including such variables as the viscosity and the friction factor of the fluids. However, it has been found that for many fluids of interest, such as those set forth in the organic systems of the working examples below, a linear flow rate through the small diameter d of at least about 0.5 meters per second (a volumetric flow rate of at least about 0.9 cubic meters per hour for a diameter d of 25 mm), preferably at least about 1.4 meters per second (a volumetric flow rate of at least about 2.5 cubic meters per hour for a diameter d of 25 mm) has been sufficient. Although the turbulence is dependent on the linear flow rate as opposed to volumetric flow rate, the volumetric flow rate is given for an illustration of the surprisingly large volumetric treatment capacity for even relatively small reactor. For example, in the case of water in the examples below, a volumetric flow rate of 0.7 cubic meters per hour when d=20 mm, corresponding to a linear flow rate of about 0.6 meters per second through the narrow passages, was found to be sufficient to achieve highly effective heat transfer.

Superior results for organic materials have been found without undue force being required for pumping the material therethrough for linear flow rates at least about two, especially at least about six, meters per second (a volumetric flow rate of about 3.67, especially about 11, cubic meters per hour for a diameter d of 25 mm). However, the improvement in molecular weight and molecular weight distribution with each increase in flow was not as pronounced at higher rates. The other dimensions of the reactor are dependent upon the diameter d according to the ratios and ranges set forth above. Thus, with a reactor of internal diameter of only about 1″ at the diameter d and 2″−5″ at diameter D, material at a volumetric flow rate of 2.5 cubic meters per hour to 11 cubic meters per hour or more may be treated. Production rates in other situations will depend upon the materials being treated and the treatment being carried out.

Accordingly, the method of this invention may be carried out as follows. A fluid, which may be a combination of fluent materials, is pumped into the entry point of the device at a pressure sufficient to achieve the desired flow rate through the mixer. The fluid may be of a single component, for example, in cases in which a purely heat exchanging operation is carried out. More typically, however, the fluid would be a combination of components, such as two liquid reactants, a liquid and particulate matter (e.g., finely divided solids) or a gas and liquid in such cases as for aerating the liquid. In the case in which heat exchange is desired, the mixer is surrounded by a heat transfer means such as discussed above. The mixer is designed for continuous flow processes and as such, may be installed directly in a continuous process system.

The present inventors, therefore, have discovered a particular design that is capable of achieving mixing at an intensity and efficiency unmatched by the myriad of designs currently employed. While not wishing to be bound by any particular theory, the inventors believe that the particular configuration of the present device achieves such intensity and efficiency by operating on the fluid in the following manner. Passing the fluid through the diffuser initiates a turbulent vortex. The central conduit allows the vortex to reach maximum intensity before the fluid reaches the confuser. Thus, the length of the conduit should be long enough to allow a full swirl of fluid to develop, but not so long to allow dampening of the turbulent vortex before reaching the confuser. The chambers should be connected to avoid dampening the turbulence before a new vortex is developed in the next chamber. Thus, it is highly preferred that the chambers be contiguous, that is, that they abut each other. Turbulence dampens quickly as the chambers are spaced apart. Thus, while a spacing of, say, up to one-tenth of the length of the central section or conduit may result in significant dampening that can be tolerated in some cases, a spacing on the order of one-half or more of the length of the central section may result in substantial and highly undesirable dampening.

The importance and distinctiveness of this design can be seen in the fact that deviations from the design in shape or dimensions results in dramatic diminution of effectiveness. Thus, if portions of the chambers are curved with respect to the axis extending therethrough (that is, if a plane in which the axis lies intersects a chamber wall in a curve instead of straight line segments) such as if the diffusers or confusers are bell-shaped, or the chambers are spaced apart such as by cylindrical conduits linking the confuser of one chamber to the diffuser of the next, or if the cylindrical conduit 2 were so long as to permit a diminution of turbulence before the fluid reaches the confuser or so short as to interrupt the full swirl of turbulence, the degree of mixing decreases drastically.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

Five-chamber thermostatic-jacketed, horizontally oriented devices of the design of this invention with relative dimensions within and outside the optimum ranges were studied for heat transfer effectiveness. The diameter d of each device was 2 cm. Water was passed through the device at a rate of 0.7 meters per second. In order to measure the heat transfer, each device was equipped with a differential thermocouple, digital millivoltmeter and rotameter to measure the rate of flow into the first chamber and the temperature difference of the liquid being treated between a point immediately before the liquid enters the device and a point at which the liquid exits the device. The heat removal achieved was recorded as the temperature loss per volume of liquid treated. The results obtained are set forth in the table below, with the first seven trials representing relative dimensions within the optimum ranges, $\alpha$ being given in degrees and SHR being the specific heat removal in °C. per square centimeter of surface area of the device.

| Trial No. | D:d | L:d | L:D | α | SHR |
| --- | --- | --- | --- | --- | --- |
| 1 | 5 | 3 | 0.6 | 60 | 230 |
| 2 | 3 | 3 | 1 | 45 | 233 |
| 3 | 2 | 3 | 1.5 | 60 | 234 |
| 4 | 2 | 2 | 1 | 60 | 231 |
| 5 | 2 | 1 | 0.5 | 60 | 226 |
| 6 | 2 | 3 | 1.5 | 30 | 231 |
| 7 | 2 | 3 | 1.5 | 45 | 233 |
| 8* | 6.67 | 3 | 0.45 | 60 | 165 |
| 9* | 1.43 | 3 | 2.1 | 60 | 186 |
| 10* | 2 | 0.5 | 0.25 | 60 | 190 |
| 11* | 2 | 5 | 2.5 | 60 | 164 |
| 12* | 2 | 3 | 1.5 | 25 | 183 |
| 13* | 2 | 3 | 1.5 | 70 | 185 |

*Comparative tests not within optimum ranges.

EXAMPLE 2

Four-chamber devices of the design of this invention with relative dimensions within and outside the optimum ranges were studied for effectiveness in emulsification. Water and colored carbon tetrachloride were pumped through the devices at rates sufficient to ensure turbulent flow (not less than 2.5 m³/hr) to form emulsions in which carbon tetrachloride droplets were dispersed through a continuous water phase. The quality of the resulting emulsions was analyzed by photographic and microscopic methods. A higher quality emulsion is indicated by a lower mean diameter of the carbon tetrachloride particles and a higher portion of the particles close to the mean. Trial numbers 1 through 12 were conducted at a flow rate of 130 liters per minute (7.8 m³/hr). In all trials (1–13), the device was arranged vertically and the flow was against gravity. Trial number 11 was conducted with one of the components injected into the inlet flow stream at an angle of about 45° from the axis of the device to intersect the flow of the other component (which was injected axially into the device) before entry into the first chamber. Trial number 12 was conducted with one of the components injected at an angle of 90° from the axial flow of the other component (i.e., the flow of one component was vertically upward and the other horizontal) and the flows again intersected before entry into the first chamber. Trial number 13 was conducted at a reduced flow rate of 70 liters per minute (4.2 m³/hr). The results are set forth in the following table, in which α is in degrees, μ represents the mean carbon tetrachloride particle diameter in microns and "Concentration" is the numerical percentage of particles within twelve percent of the mean diameter. The first four trials representing relative dimensions within the optimum ranges.

| Trial No. | D:d | L:d | L:D | α | μ | Concentration |
| --- | --- | --- | --- | --- | --- | --- |
| 1 | 5 | 3 | 0.6 | 60 | 20 | 85 |
| 2 | 2 | 3 | 1.5 | 60 | 15 | 90 |
| 3 | 2 | 1 | 0.5 | 60 | 20 | 80 |
| 4 | 2 | 3 | 1.5 | 30 | 20 | 85 |
| 5* | 6.67 | 3 | 0.45 | 30 | 70 | 70 |
| 6* | 1.43 | 3 | 2.1 | 30 | 60 | 75 |
| 7* | 2 | 0.5 | 0.25 | 30 | 100 | 70 |
| 8* | 2 | 5 | 2.5 | 30 | 70 | 85 |
| 9* | 2 | 3 | 1.5 | 20 | 50 | 75 |
| 10* | 2 | 3 | 1.5 | 70 | 45 | 75 |
| 11* | 2 | 3 | 1.5 | 30 | 30 | 70 |
| 12* | 2 | 3 | 1.5 | 30 | 35 | 65 |
| 13* | 2 | 3 | 1.5 | 30 | 750 | 75 |

*Comparative tests not within optimum ranges.

These results indicate that an L:d ratio below the optimum range leads to a rapid deterioration in emulsion quality in terms of the degree of dispersion. It is believed that this deterioration is due to deformation of the turbulent vortex when contacting the wall of the confuser section. Although an L:d ratio above the optimum range does not appear in these trials to have led to a significant drop in emulsion quality, it is undesirable because it leads to an increase in the dimensions of the device.

These results also indicate that varying the direction of flow (i.e., the angle of orientation of the device) from upward influenced the particle size only slightly, but the degree of dispersion worsened sharply and dynamic stagnation zones formed near the border between the diffusers and the cylinder sections, where relatively large particles resided too long. Decrease of flow rates were found to lead to larger particles.

EXAMPLE 3

The influence of density on the optimum angle α for mixing was studied by pumping 50:50 volume water/organic mixtures at 2 liters per second through nine-chamber devices of various angles α in which D was 50 mm, d was 25 mm and L was 100 mm and measuring the droplet size of the resulting dispersed organic phase. The following results were obtained for each water/organic mixture.

| Numerical % of Drops Having a Diameter Less Than 1 mm | | | |
| --- | --- | --- | --- |
| α (°) | Water/Hexane | Water/Dichloroethane | Water/CCl₄ |
| 0 | 50 | 47 | 43 |
| 17 | 100 | 95 | 75 |
| 30 | 95 | 95 | 78 |
| 45 | 85 | 80 | 95 |
| 60 | 60 | 60 | 84 |

For reference, the density of hexane is 0.66 gm/cm³, of dichloroethane is about 1.2 gm/cm³, and of carbon tetrachloride is about 1.6 gm/cm³. The viscosities of these organics increases with density (0.33 cp, 0.80 cp and 0.97 cp, respectively), but in this situation, it is believed that the densities and not the viscosities influenced the optimum angle. These data indicate that in the case of a low density of one of the components (hexane), the optimum angle α was in the range of about 17° to about 30° and that as the density increased, did the optimum value of the angle α, to 17°–45° for dichloroethane and 45°–60° for carbon tetrachloride.

EXAMPLE 4

The effect of varying angle α on isobutylene oligomerization was studied with five chamber devices in which D was 52 mm, d was 25 mm and L was 104 mm. The reaction was carried out a −5° C. (with no thermostatting jacket), and an isobutylene concentration of 20% by weight in the presence of $4.5 \times 10^{-3}$ mole/liter AlCl₃ in C₂H₅Cl. High molecular weight, indicating greater reaction progress, and a narrow range of molecular weights, indicating thorough mixing and temperature homogeneity, were desired. The results for a flow rate of 2.7 m³/hr. are shown in the following table, in which α is in degrees, MW refers to molecular weight and MWD is the molecular weight distribution in terms of the percent range about the mean molecular weight in which the molecular weights falls.

| Trial No. | α | MW | MWD |
|---|---|---|---|
| 1 | 0 | 600 | 12.0 |
| 2 | 12 | 630 | 11.2 |
| 3 | 20 | 650 | 11.6 |
| 4 | 30 | 1000 | 4.2 |
| 5 | 45 | 1100 | 3.7 |
| 6 | 50 | 1100 | 3.5 |
| 7 | 60 | 1100 | 3.8 |
| 8 | 65 | 850 | 9.6 |

Further tests were conducted with the device of trial 5 of this example; that is, the device in which the angle α is 45°. The tests were conducted with the same reactants as the earlier trials of this example, but at various flow rates. The following results were obtained, wherein the flow rates, Q, are given in $m^3/hr$.

| Trial No. | O | MW | MWD |
|---|---|---|---|
| 1 | 1.5 | 600 | 9.3 |
| 2 | 2.0 | 710 | 8.7 |
| 3 | 2.3 | 740 | 8.4 |
| 4 | 2.5 | 1100 | 3.6 |
| 5 | 3.0 | 1150 | 3.2 |
| 6 | 7.0 | 1230 | 3.0 |
| 7 | 11.0 | 1310 | 3.0 |

EXAMPLE 5

A device of the design of the present invention was tested against a standard bulk reactor (a continuously stirred tank reactor) in isoprene polymerization. The device comprised five chambers, the linear flow rate through the narrow diameters d was 2.5 meters per second, D was 100 mm, d was 50 mm, angle α was 45° and L was 300 mm. The device was not fitted with a thermostatting jacket. Conventional isoprene polymerization technique were employed with the standard bulk reactor. The following comparative results were obtained.

|  | Standard Bulk Reactor | Device of Present Invention |
|---|---|---|
| Percentage of cis-1,4-links | 97 to 98 | 98.0 to 98.7 |
| Density ($kg/m^3$) | 910 to 920 | 910 to 920 |
| Percentage of metal impurities in the rubber product*: | | |
| iron | 0.001 to 0.002 | trace |
| titanium | 0.04 to 0.05 | 0.001 to 0.002 |
| Loss of mass at 105° C. (%) | 0.40 to 0.45 | 0.20 to 0.25 |
| Catalyst consumption (relative) | 1 | 0.4 |

*Lower metal impurity is associated with an increase in resistance to heat.

In view of the above, it will be seen that the several advantages of the invention are achieved and other advantageous results attained.

As various changes could be made in the above methods and compositions without departing from the scope of the invention, it is intended that all matter contained in the above description and shown in the accompanying drawing shall be interpreted as illustrative and not in a limiting sense.

We claim:

1. A device for inducing turbulence in the flow of a fluid along a center axis of the device in the course of a continuous flow process, the device comprising:
a plurality of chambers, each chamber having a central conduit section having a length extending from an inlet section to an outlet section, the inlet, central and outlet sections defining an interior surface of the chamber,
the inlet section having a shape that progressively reduces the velocity and pressure of fluid flowing through it,
the central section having a shape that tends to maintain constant the pressure and velocity of fluid flowing through it,
the outlet section having a shape that progressively increases the pressure and velocity of fluid flowing through it; and
wherein each of the inlet, central and outlet sections of each chamber extends along the center axis, and each plane in which the axis lies intersects the interior surface of the chamber in straight line segments, and with respect to each pair of the plurality of chambers, each pair consisting of an upstream chamber adjacent to a downstream chamber, the outlet section of the upstream chamber being connected to the inlet section of the downstream chamber in a manner such as to maintain turbulence in fluid flowing through the device and being no farther from the inlet section of the downstream chamber than half the length of the central section of either of the chamber of the pair.

2. A device as set forth in claim 1 wherein:
the shape of the inlet section and the shape of the outlet section of each chamber cause respective decreases and increases in pressure and velocity to be exponential.

3. A device as set forth in claim 2 wherein:
the central section of each chamber has a length extending from the inlet section to the outlet section of the chamber and, with respect to each pair of chambers, the outlet section of the upstream chamber is connected to the inlet section of the downstream chamber by a conduit no longer than about half the length of the central section of either of the chambers in the pair.

4. A device as set forth in claim 2 wherein:
the central section of each chamber has a length extending from the inlet section to the outlet section of the chamber, the chambers are arranged coaxially along a central axis and, with respect to each pair of the plurality of chambers, the outlet section of the upstream chamber is contiguous with the inlet section of the downstream chamber.

5. A device as set forth in claim 1 wherein: the number of chambers is from two to about twelve, so that the number of pairs is from one to about eleven.

6. A device as set forth in claim 4 wherein:
the inlet section of each chamber has an inlet and has an outlet contiguous with the upstream end of the central section, and
the outlet section of each chamber has an inlet contiguous with the downstream end of the central section and has an outlet of cross-sectional area substantially equal to that of the inlet of the inlet section.

7. A device as set forth in claim 6 wherein:
the central section of each chamber is of substantially constant cross section.

8. A device as set forth in claim 7 wherein:
substantially all cross-sections through the inlet, outlet and central sections are substantially circular.

9. A device as set forth in claim 8 wherein:

the inlet and outlet sections of each chamber are frusto-conical.

10. A device as set forth in claim 9 wherein:
the inlet section and the outlet section of each chamber has an internal surface that has a slope with respect to the axis of from about 15° to about 60°.

11. A device as set forth in claim 10 wherein:
the central section of each chamber is a cylinder of constant diameter and the inlet of the inlet section and the outlet of the outlet section of each chamber are of substantially equal circular cross-sections that are from about 0.2 to about 0.5 times the constant diameter of the central section.

12. A device as set forth in claim 11 wherein:
the length of the central section of each chamber is in the range of from about equal to the reduced diameter of the inlet of the inlet section of the chamber to about five times the constant diameter of the central section of the chamber.

13. A device as set forth in claim 12 wherein the chambers are enveloped in a heat transfer means.

14. A method for reacting fluent materials in a continuous flow process comprising:
(1) injecting the materials into a device along a center axis of the device at a flow rate sufficient to create turbulence, the device comprising:
a plurality of chambers, each chamber having a central conduit section extending from an inlet section to an outlet section, the inlet, central and outlet sections defining an interior surface of the chamber,
the inlet section having a shape that progressively reduces the velocity and pressure of fluid flowing through it,
the central section having a shape that tends to maintain constant the pressure and velocity of fluid flowing through it,
the outlet section having a shape that progressively increases the pressure and velocity of fluid flowing through it; and
wherein each of the inlet, central and outlet sections of each chamber extends along the center axis, and each plane in which the axis lies intersects the interior surface of the chamber in straight line segments, and with respect to each pair of the plurality of chambers, each pair consisting of an upstream chamber adjacent to a downstream chamber, the outlet section of the upstream chamber being connected to the inlet section of the downstream chamber in a manner such as to maintain turbulence in fluid flowing through the device; and
(2) effecting a chemical reaction of the materials as they flow through the device.

15. A method as set forth in claim 14 wherein:
the shape of the inlet section and the shape of the outlet section of each chamber cause respective decreases and increases in pressure and velocity to be exponential.

16. A method as set forth in claim 15 wherein:
the central section of each chamber has a length extending from the inlet section to the outlet section of the chamber and, with respect to each pair of chambers, the outlet section of the upstream chamber is connected to the inlet section of the downstream chamber by a conduit no longer than about half the length of the central section of either of the chambers in the pair.

17. A method as set forth in claim 16 wherein:
the chambers are arranged coaxially along a central axis and, with respect to each pair of the plurality of chambers, the outlet section of the upstream chamber is contiguous with the inlet section of the downstream chamber.

18. A method as set forth in claim 17 wherein:
the inlet section of each chamber has an inlet and has an outlet contiguous with the upstream end of the central section, and
the outlet section of each chamber has an inlet contiguous with the downstream end of the central section and has an outlet of cross-sectional area substantially equal to that of the inlet of the inlet section.

19. A method as set forth in claim 18 wherein:
each of the inlet section and the outlet section of each chamber has an internal surface that has a slope with respect to the axis of from about 15° to about 60°.

20. A method as set forth in claim 19 wherein:
the central section of each chamber is a cylinder of constant diameter and the inlet of the inlet section and the outlet of the outlet section of each chamber are of substantially circular cross-section of a reduced diameter that is from about 0.2 to about 0.5 times the constant diameter of the central section.

21. A method as set forth in claim 20 wherein:
the length of the central section of each chamber is in the range of from about equal to the reduced diameter of the inlet of the inlet section of the chamber to about five times the constant diameter of the central section of the chamber.

22. A method as set forth in claim 21 wherein:
the chambers are enveloped in a heat transfer means, and
heat transfer is effected between the heat transfer means and the materials as they flow through the device.

23. A method as set forth in claim 18 wherein: the axis is generally horizontal.

24. A method as set forth in claim 18 wherein: the axis is generally vertical.

25. A method as set forth in claim 24 wherein:
the device is oriented such that the inlet section of each chamber is below the outlet of the chamber and the materials are directed upwardly through the device.

26. A method as set forth in claim 14 wherein:
the materials are injected at a rate such that the materials pass through the reduced diameters of the inlet of the inlet section of each chamber at a linear flow rate of at least about 0.5 meters per second.

27. A device for inducing turbulence in the flow of a fluid in the course of a continuous flow process, the device comprising a series of chambers extending along an axis, each chamber being defined by:
a conduit of at least substantially cylindrical form having a length extending along the axis and between opposite ends;
a generally frusto-conical diffuser having an internal cross-section increasing along the axis from a reduced internal cross-section at an inlet of the diffuser to an internal cross-section substantially equal to that of the conduit at an outlet of the diffuser; and
a generally frusto-conical confuser having an internal cross-section decreasing along the axis from an internal cross-section substantially equal to that of the conduit at an inlet of the confuser to a reduced cross-section at an outlet of the confuser;

the conduit, diffuser and confuser of each chamber being arranged coaxially, the conduit extending from the outlet of the diffuser to the inlet of the confuser, the outlet of one confuser and the inlet of one diffuser of adjacent chambers in the series being connected together to maintain the adjacent chambers in fluid communication therebetween in a manner such as to maintain turbulence in fluid flowing through the device and being no farther apart than half the length of the conduit.

28. A device as set forth in claim 27 wherein:
the conduit of each chamber has a length extending from the diffuser to the confuser section of the chamber and, with respect to each pair of adjacent chambers, the outlet of one confuser and the inlet of one diffuser of adjacent chambers in the series are connected together, yet spaced apart by no more than about half the length of the conduit.

29. A device as set forth in claim 27 wherein:
the conduit of each chamber has a length extending from the diffuser to the confuser section of the chamber and, the chambers are arranged coaxially along a central axis and, with respect to each pair of the plurality of chambers, the outlet section of the upstream chamber is contiguous with the inlet section of the downstream chamber.

30. A device as set forth in claim 29 wherein:
the diffuser, confuser and conduit of each chamber are each of circular cross-section.

31. A device as set forth in claim 30 wherein:
each diffuser and each confuser is substantially frusto-conical and has an internal surface that has a slope with respect to the axis of from about 15° to about 60°.

32. A device as set forth in claim 31 wherein:
the diameters of the reduced cross-sections of the inlet of the diffuser and the outlet of the confuser of each chamber are from about 0.2 to about 0.5 times the diameter of the conduit of the chamber.

33. A device as set forth in claim 32 wherein:
the length of the conduit of each chamber is in the range of from about equal to the diameter of the reduced cross-section of the diffuser of the chamber to about five times the diameter of the conduit.

34. A device as set forth in claim 33 having two to about twelve chambers.

35. A device as set forth in claim 27 wherein:
the chambers are enveloped in a heat transfer means.

36. A device for inducing turbulence in the flow of a fluid in the course of a continuous flow process, the device comprising:
a plurality of chambers, each chamber having a central section, an inlet section and an outlet section arranged along a center axis, the inlet and outlet sections each having an entrance and an exit,
the central section defining a hollow interior having an axial length of constant cross-sectional area extending from the exit of the inlet section to the entrance end of the outlet section,
the inlet section defining a hollow interior with an axial length extending from the entrance to the exit of the inlet section, the interior having a cross-sectional area at any point x along the axis from the entrance to the exit of the inlet section proportional to $(D_i+K_i)^2$, wherein $K_i$ is a constant and $D_i$ is the axial distance from the entrance of the inlet section to point x, the outlet section defining a hollow interior with an axial length extending from the entrance to the exit of the outlet section, the interior having a cross-sectional area at any point y along the axis from the entrance to the exit of the outlet section proportional to $(D_o+K_o)^2$, wherein $K_o$ is a constant and $D_o$ is the axial distance from the exit of the outlet section to point y;

with respect to each pair of the plurality of chambers, each pair consisting of an upstream chamber and a downstream chamber, the outlet section of the upstream chamber being connected to the inlet section of the downstream chamber in a manner such as to maintain turbulence in fluid flowing through the device and being no farther from the downstream chamber than half the axial length of the central section of either of the chambers of the pair.

37. A device as set forth in claim 36 wherein with respect to each pair of chambers:
the outlet section of the upstream chamber is connected to the inlet section of the downstream chamber by a conduit no longer than about half the axial length of the interior of the central section.

38. A device as set forth in claim 36 wherein:
the chambers are arranged coaxially along the axis and, with respect to each pair of the plurality of chambers, the outlet section of the upstream chamber is contiguous with the inlet section of the downstream chamber.

39. A device as set forth in claim 37 wherein with respect to each chamber:
the axial length of the interior of the central section extends from an upstream end of the central section to a downstream end of the central section,
the exit of the inlet section of each chamber is contiguous with the upstream end of the central section, and
the entrance of the outlet section of each chamber is contiguous with the downstream end of the central section and has a cross-sectional area substantially equal to that of the exit of the inlet section.

40. A device as set forth in claim 39 wherein:
the inlet section, central section and outlet section of each chamber are arranged concentrically and substantially all cross-sections of the interiors of the inlet, outlet and central sections are substantially circular.

41. A device as set forth in claim 40 wherein:
the inlet and outlet sections of each chamber are frusto-conical.

42. A device as set forth in claim 41 wherein $K_i=K_o$.

43. A device as set forth in claim 41 wherein:
the inlet section and the outlet section of each chamber each has an internal surface defining the interior thereof, the internal surface having a slope with respect to the axis of from about 15° to about 60°.

44. A device as set forth in claim 43 Wherein:
the interior of the central section of each chamber is defined by a cylinder of constant diameter and the entrance of the inlet section and the exit of the outlet section of each chamber are of substantially equal circular cross-sectional areas having a diameter from about 0.2 to about 0.5 times the constant diameter of the central section.

45. A device as set forth in claim 44 wherein:
entrance of the inlet section has a reduced diameter less than that of the cross-sectional area of the exit of the inlet section and the axial length of the interior of the central section of each chamber is in the range of from about equal to the reduced diameter of the inlet section of the chamber to about five times the constant diameter of the central section of the chamber.

46. A device as set forth in claim 45 wherein the chambers are enveloped in a heat transfer means.

47. A method for mixing fluent materials in a continuous flow process comprising injecting the materials into a device at a flow rate sufficient to create turbulence in the device, the device comprising:
a plurality of chambers, each chamber having a central section, an inlet section and an outlet section arranged along a center axis, the inlet and outlet sections each having an entrance and an exit,
the central section defining a hollow interior having an axial length of constant cross-sectional area extending from the exit of the inlet section to the entrance of the outlet section,
the inlet section defining a hollow interior with an axial length extending from the entrance to the exit of the inlet section, the interior having a cross-sectional area at any point x along the axis from the entrance to the exit of the inlet section proportional to $(D_i+K_i)^2$, wherein $K_i$ is a constant and $D_i$ is the axial distance from the entrance of the inlet section to point x,
the outlet section defining a hollow interior with an axial length extending from the entrance to the exit of the outlet section, the interior having a cross-sectional area at any point y along the axis from the entrance to the exit of the outlet section proportional to $(D_o+K_o)^2$, wherein $K_o$ is a constant and $D_o$ is the axial distance from the exit of the outlet section to point y;
with respect to each pair of the plurality of chambers, each pair consisting of an upstream chamber and a downstream chamber, the outlet section of the upstream chamber being connected to the inlet section of the downstream chamber in a manner such as to maintain turbulence in fluid flowing through the device and being no farther from the downstream chamber than half the axial length of the central section of either of the chambers of the pair.

48. A method as set forth in claim 47, further comprising the step of effecting a chemical reaction of the materials as they flow through the device.

49. A method as set forth in claim 47 wherein with respect to each pair of chambers:
the outlet section of the upstream chamber is connected to the inlet section of the downstream chamber by a conduit no longer than about half the axial length of the interior of the central section.

50. A method as set forth in claim 47 wherein:
the chambers are arranged coaxially along the axis and, with respect to each pair of the plurality of chambers, the outlet section of the upstream chamber is contiguous with the inlet section of the downstream chamber.

51. A method as set forth in claim 50 wherein with respect to each chamber:
the axial length of the interior of the central section extends from an upstream end of the central section to a downstream end of the central section,
the exit of the inlet section of each chamber is contiguous with the upstream end of the central section, and
the entrance of the outlet section of each chamber is contiguous with the downstream end of the central section and has a cross-sectional area substantially equal to that of the exit of the inlet section.

52. A method as set forth in claim 51 wherein:
the inlet section, central section and outlet section of each chamber is arranged concentrically and the inlet section and the outlet section of each chamber each has an internal surface defining the interior thereof, the internal surface having a slope with respect to the axis of from about 15° to about 60°.

53. A method as set forth in claim 52 wherein:
the interior of the central section of each chamber is defined by a cylinder of constant diameter and the entrance of the inlet section and the exit of the outlet section of each chamber are of substantially equal circular cross-sectional areas having a diameter from about 0.2 to about 0.5 times the constant diameter of the central section.

54. A method as set forth in claim 53 wherein:
entrance of the inlet section has a reduced diameter less than that of the cross-sectional area of the exit of the inlet section and the axial length of the interior of the central section of each chamber is in the range of from about equal to the reduced diameter of the inlet section of the chamber to about five times the constant diameter of the central section of the chamber.

55. A method as set forth in claim 54 wherein the chambers are enveloped in a heat transfer means, and heat transfer is effected between the heat transfer means and the materials as they flow through the device.

56. A device as set forth in claim 10 wherein:
the slope with respect to the axis of the internal surface of each of the inlet section and the outlet section of each chamber is from about 30° to about 60°.

57. A method as set forth in claim 21 wherein:
the fluent materials comprise two liquid reactants of given viscosity and density and the slope with respect to the axis of the internal surface of each of the inlet section and the outlet section of each chamber is from about 15° to about 30° if the ratio of the viscosities of the liquid reactants is outside the range of from about 1:5 to about 5:1 and otherwise from about 30° to about 60°, 58. A method as set forth in claim 57 wherein:
the ratio of the viscosities is within the range of from about 1:5 to about 5:1 and the slope with respect to the axis of the internal surface of each of the inlet section and the outlet section of each chamber is from about 30° to about 60°.

59. A method as set forth in claim 21 wherein:
the fluent materials comprise two liquid reactants of given viscosity and density and the slope with respect to the axis of the internal surface of each of the inlet section and the outlet section of each chamber is from about 15° to about 30° if the ratio of the densities of the liquid reactants is outside the range of from about 1:5 to about 5:1 and otherwise from about 30° to about 60°.

* * * * *